US012034739B2

(12) United States Patent
Crudele et al.

(10) Patent No.: US 12,034,739 B2
(45) Date of Patent: Jul. 9, 2024

(54) VERIFICATION PLATFORM

(71) Applicant: Steady Platform LLC, Atlanta, GA (US)

(72) Inventors: Marcel Crudele, Atlanta, GA (US); Tyler Howard, Atlanta, GA (US); Amanda Miguel, Atlanta, GA (US); Jason Robinson, Atlanta, GA (US); Andrew Toloff, Atlanta, GA (US); Evan Johnson, Atlanta, GA (US); Jeff Chelko, Atlanta, GA (US); Elizabeth Wylie, Atlanta, GA (US); Limor Mazlin, Atlanta, GA (US); Raja Surireddy, Atlanta, GA (US)

(73) Assignee: STEADY PLATFORM LLC, Atlanta, GA (US)

(*) Notice: Subject to any disclaimer, the term of this patent is extended or adjusted under 35 U.S.C. 154(b) by 359 days.

(21) Appl. No.: 17/580,721

(22) Filed: Jan. 21, 2022

(65) Prior Publication Data
US 2023/0008975 A1 Jan. 12, 2023

Related U.S. Application Data

(60) Provisional application No. 63/139,839, filed on Jan. 21, 2021.

(51) Int. Cl.
H04W 12/126 (2021.01)
H04L 9/40 (2022.01)
H04W 12/02 (2009.01)
H04W 12/06 (2021.01)

(52) U.S. Cl.
CPC ............ *H04L 63/126* (2013.01); *H04L 63/18* (2013.01)

(58) Field of Classification Search
CPC ... H04L 63/126; H04L 63/18; H04L 63/1425; H04W 12/126; H04W 12/06; H04W 12/72; H04W 12/02
See application file for complete search history.

(56) References Cited

U.S. PATENT DOCUMENTS

| | | | |
|---|---|---|---|
| 10,460,391 B2 | 10/2019 | Caldwell | |
| 10,510,113 B2 | 12/2019 | Caldwell | |
| 10,984,468 B1 | 4/2021 | Hockey et al. | |
| 11,301,847 B1* | 4/2022 | Chang | G06Q 20/325 |
| 2015/0295906 A1* | 10/2015 | Ufford | H04L 63/0815 726/6 |
| 2018/0218448 A1 | 8/2018 | Thomas et al. | |
| 2019/0066203 A1 | 2/2019 | Smith et al. | |

(Continued)

Primary Examiner — Amie C. Lin
(74) Attorney, Agent, or Firm — Buckley, Maschoff & Talwalkar LLC

(57) ABSTRACT

Provided are systems and methods for verifying an identity of a user based on a data mesh created from various sources of truth. In one example, a method may include establishing, via a host platform, a first and a authenticated communication channel between a host server of a user account and a host server of a second user account, retrieving, via the first and second authenticated communication channels, PII of the user from the first and second user accounts and combining the PII into a meshed data set, determining a difference between the PII within the meshed data set, and verify an identity of the user based on the determined difference between the PII within the meshed data set and transmitting the verification to a computer system.

20 Claims, 10 Drawing Sheets

(56) References Cited

U.S. PATENT DOCUMENTS

| | | |
|---|---|---|
| 2020/0137080 A1 | 4/2020 | Bloomquist et al. |
| 2021/0173854 A1* | 6/2021 | Wilshinsky ......... H04L 63/0407 |
| 2021/0233162 A1 | 7/2021 | Hockey et al. |
| 2021/0326980 A1 | 10/2021 | Thomas et al. |

* cited by examiner

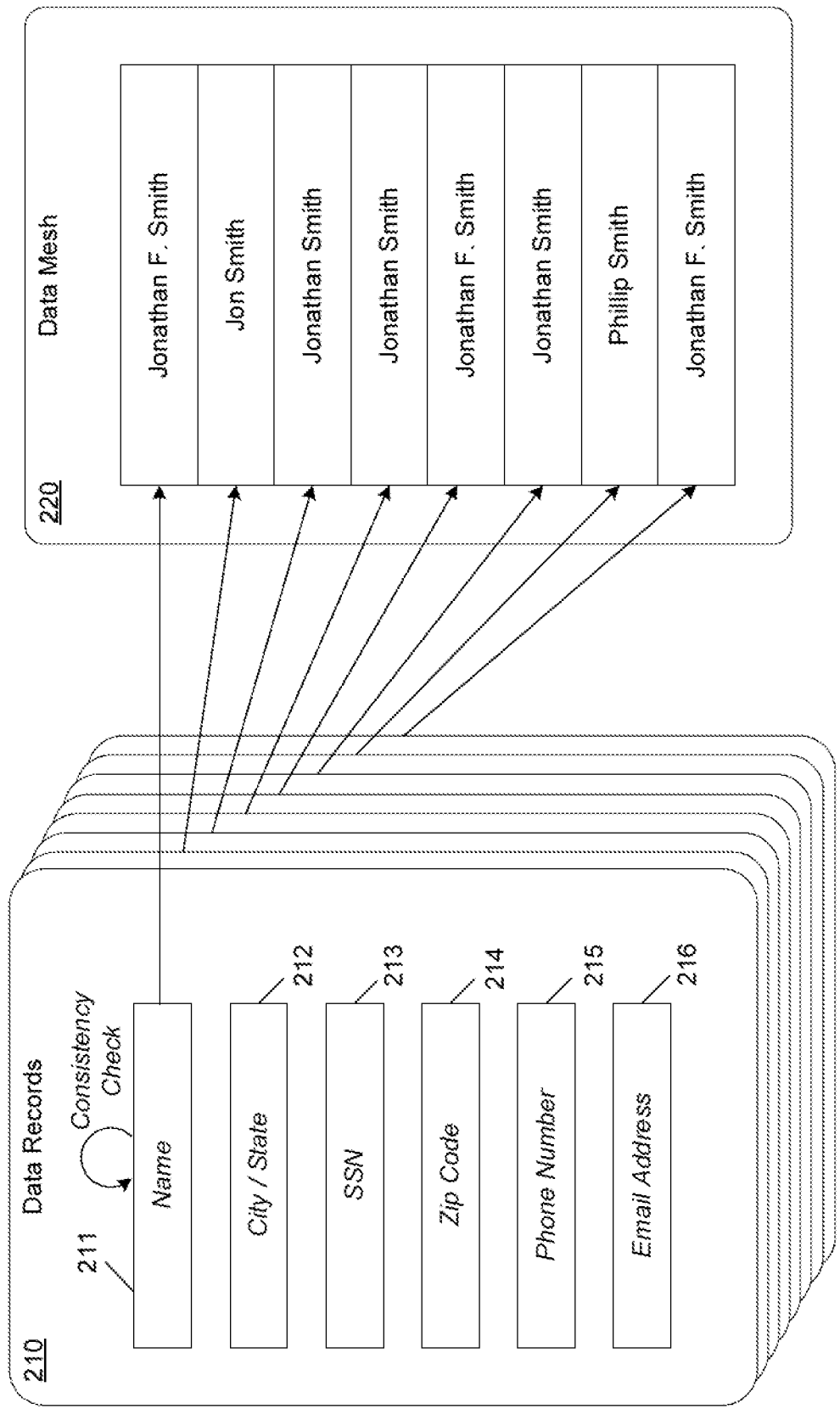

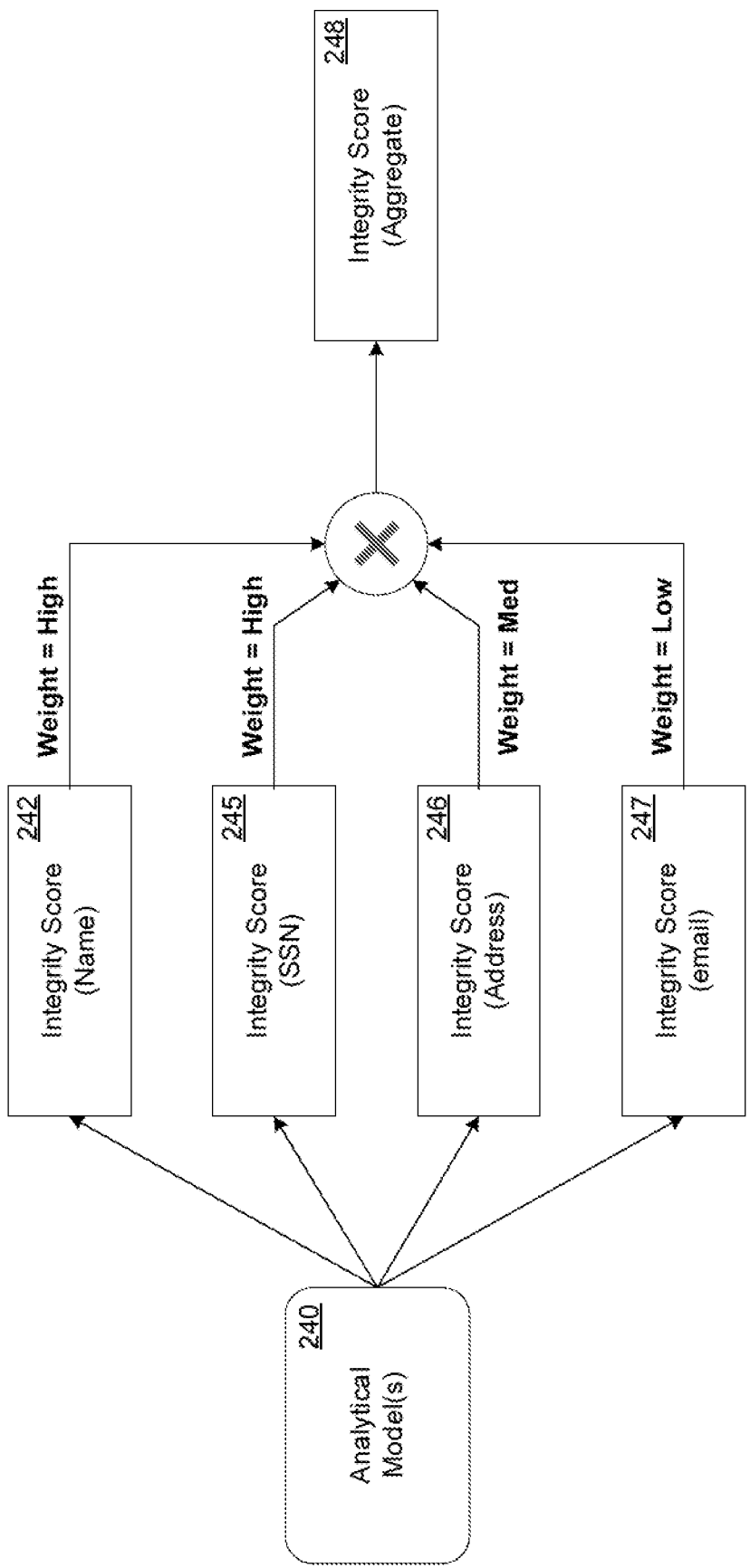

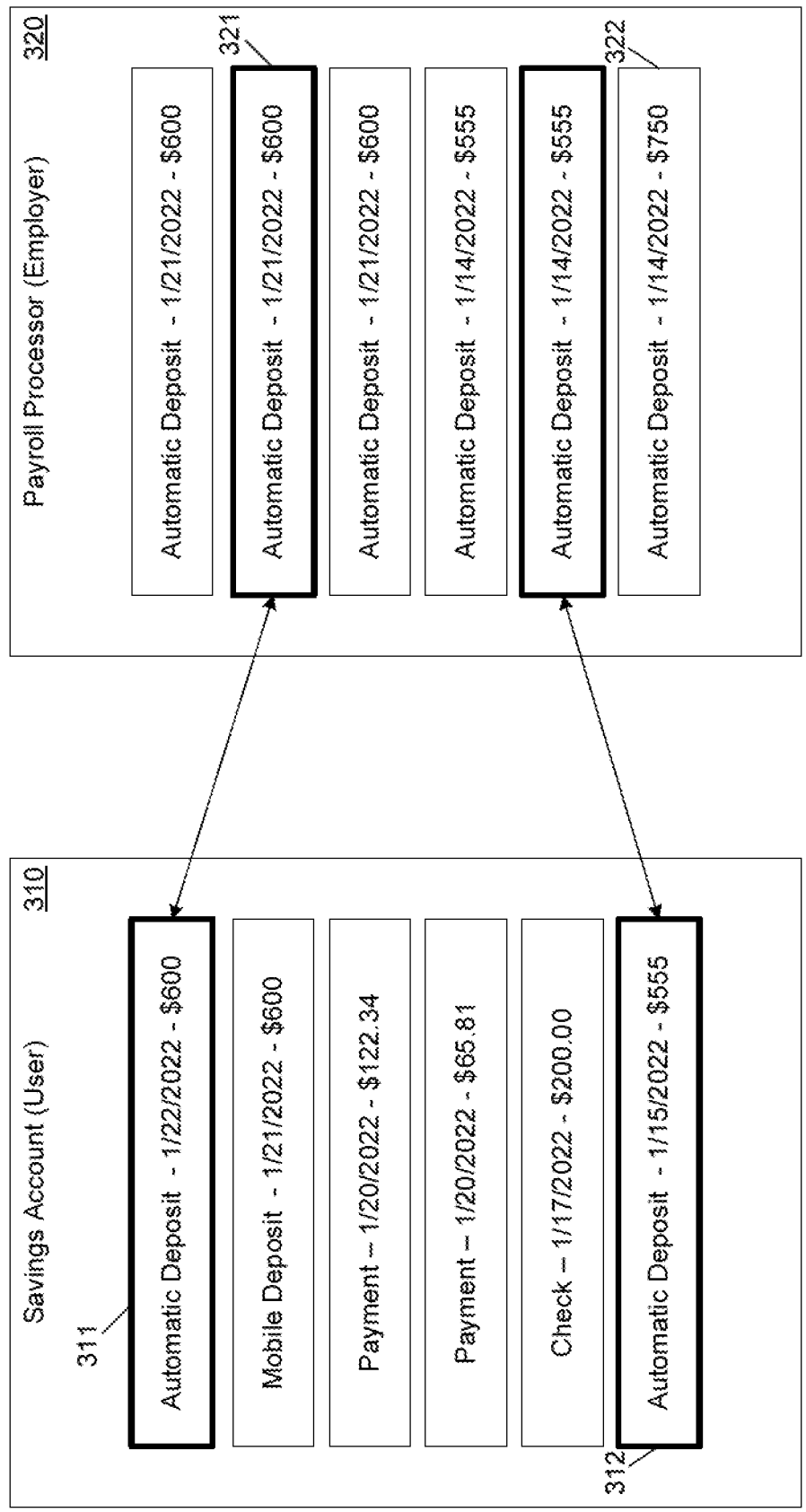

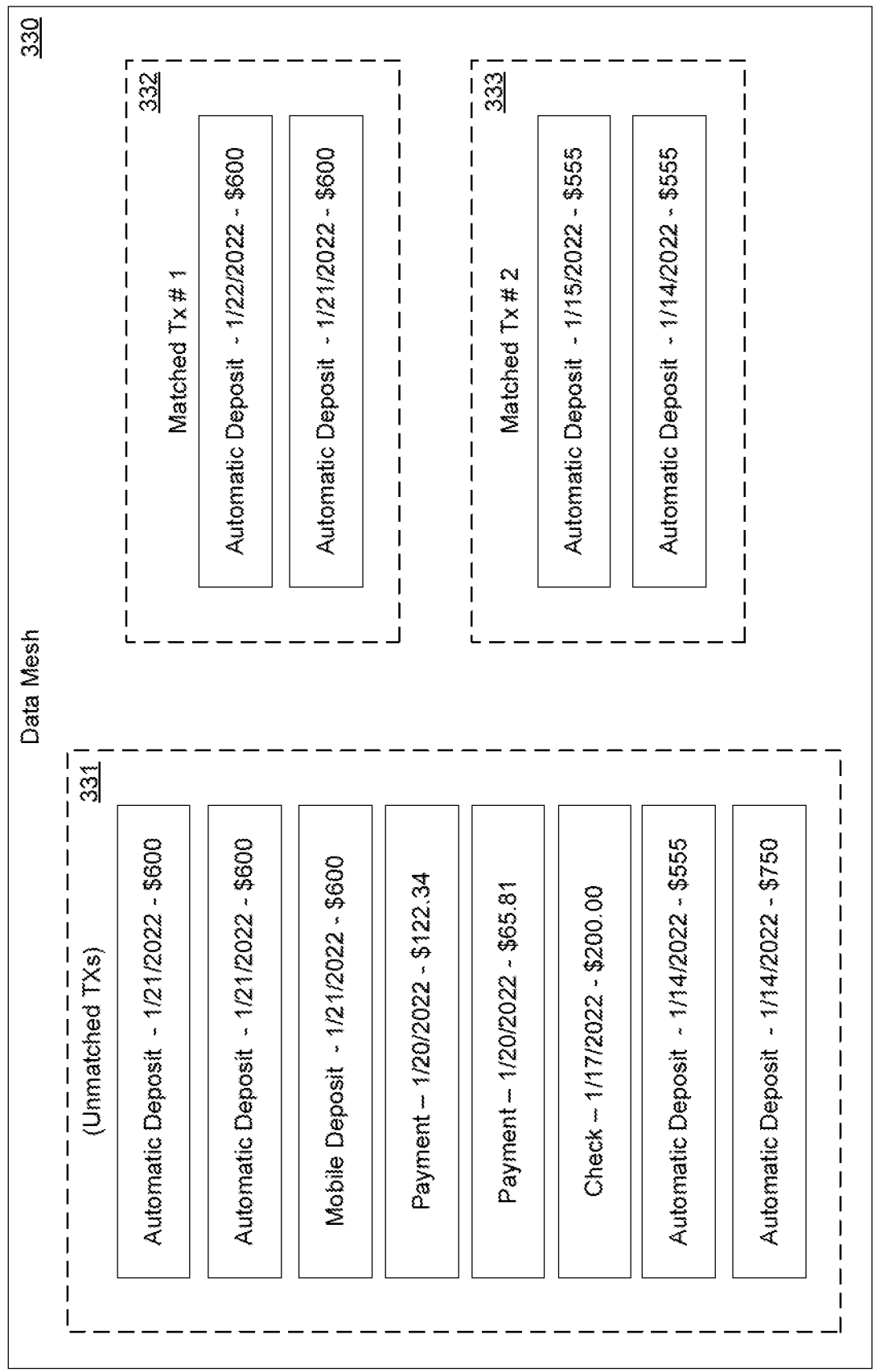

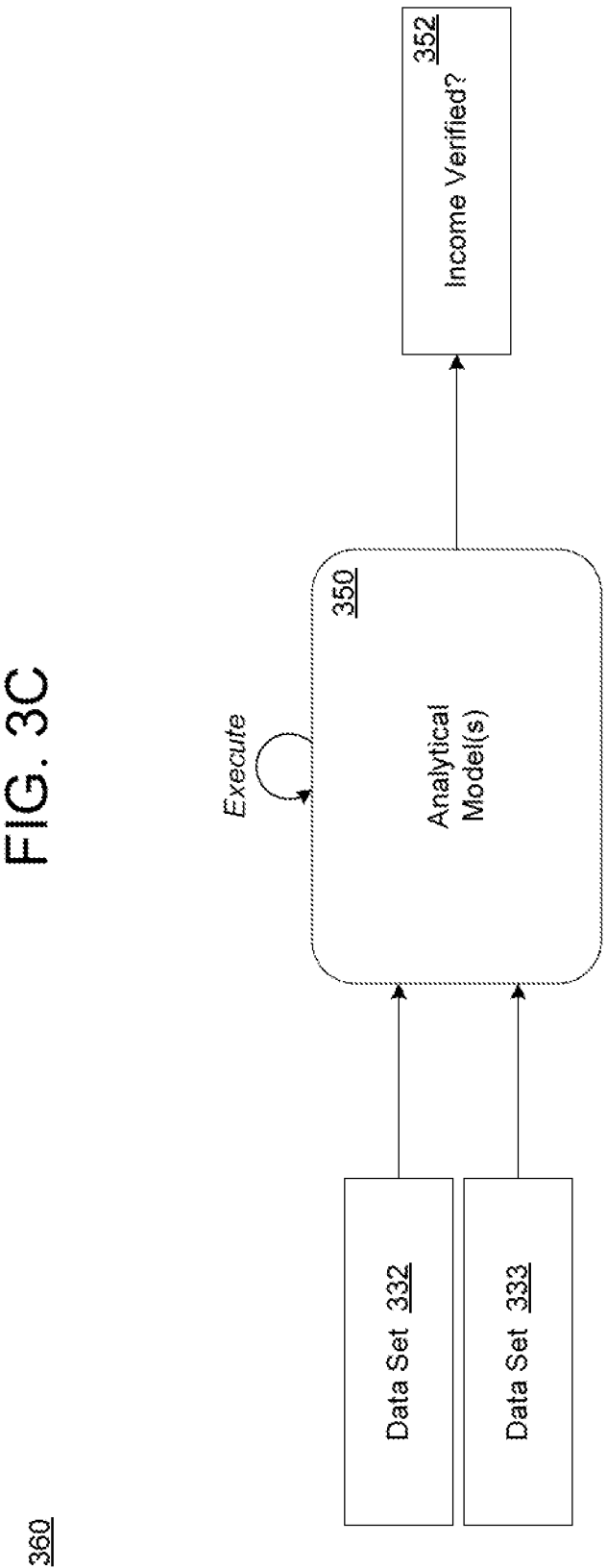

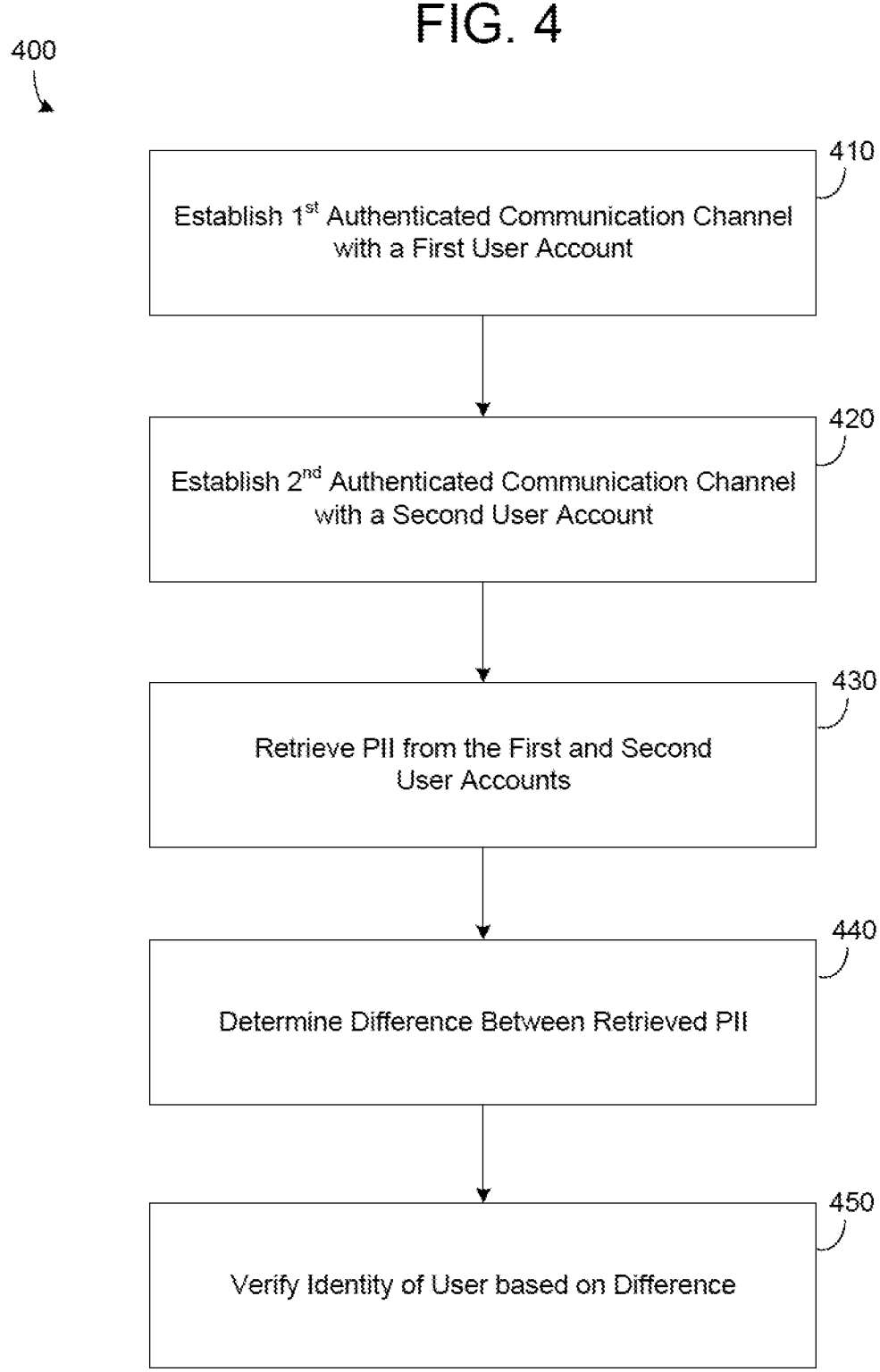

VERIFICATION PLATFORM

CROSS-REFERENCE TO RELATED APPLICATIONS

This application claims the benefit of U.S. Provisional Application No. 63/139,839, filed on Jan. 21, 2021, in the United States Patent and Trademark Office, the entire disclosure of which is hereby incorporated by reference for all purposes.

BACKGROUND

Users rely on the Internet for more and more of their daily life. For example, through interactions with web resources such as websites, mobile applications, payment sites, merchants, online marketplaces, and the like, users can conduct business, pay bills, shop, work, educate themselves, socialize, and the like. However, the cost of this access is that user information such as personally identifiable data (PII) is more prevalent than ever. Many organizations that offer web related services perform various techniques for fraud prevention. Most of these fraud prevention techniques are centered around "identity fraud", which is the act of using someone else's identity (e.g., PII and/or derivates of the PII) to commit fraud of some kind whether it be through a bank, a website, or any other arena or forum where users transact.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating an example of an identity verification process in accordance with example embodiments.

FIGS. 3A-3C are diagrams illustrating an example of an income verification process in accordance with example embodiments.

FIG. 4 is a diagram illustrating a method of executing an identity verification process in accordance with an example embodiment.

Figure 1A:
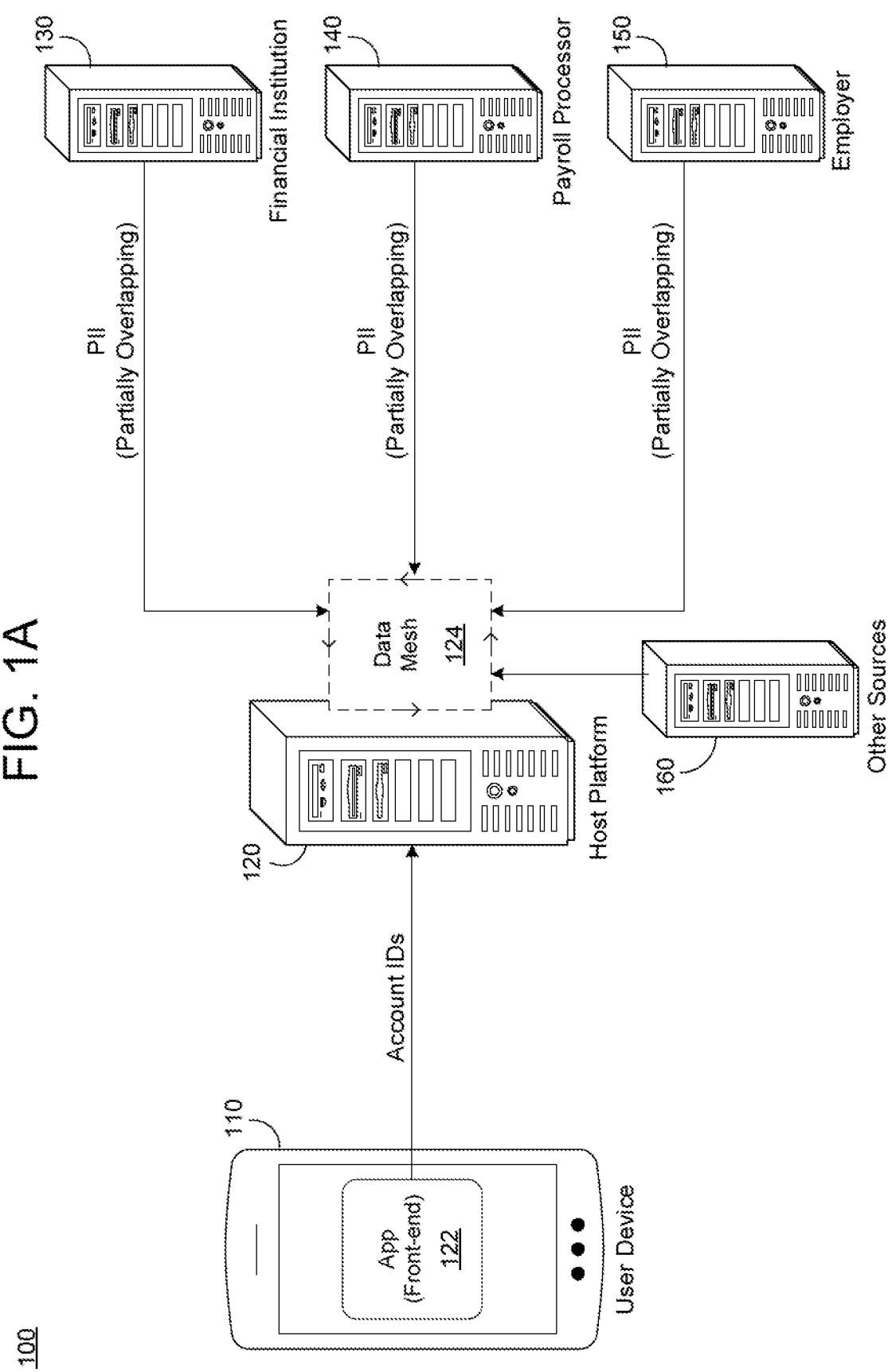
FIG. 1A is a diagram illustrating a computing environment for identity and income verification in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

This application proposes a solution to use a data-driven approach to fraud detection and prevention, and income verification. While fraud prevention measures described greatly benefit the income verification solution, they could also be employed for use cases beyond income verification.

In order to accomplish these two things, a host platform may obtain and utilize a collection of datasets including personally-identifiable information (PII) provided by a user, and PII and historic activity data provided by other accounts the user connects to, including, but not limited to: financial institution accounts, employer/gig accounts, and payroll accounts. The additional PII from other accounts provides supplemental user data from other internal data sources or 3rd parties that are verified sources of truth. A fundamental difference in this approach is that, in order to perform validation, a user connects a host platform that hosts an identity and/or income verification software to other accounts on other platforms that have independently verified the account-holders identity. This, intrinsically, has three levels of protection.

Account Creation Protection. In most cases, creating one of these accounts involves Know Your Customer (KYC) or KYC-level verification. This makes it difficult for bad actors to create one of these accounts with any information other than their own PII and passing this level of background check for multiple accounts independently verified by multiple providers is increasingly difficult. The prospect of creating spoofed accounts for each person who's PII has been compromised at scale so that the data matches is highly unlikely.

Account Access Protection. In order to access these accounts, users must know both login credentials and be able to pass 2FA (Two Factor Authentication) or even MFA (Multi-Factor Authentication). While hackers' ability to gain access to PII is relatively easy, being able to get corresponding login credentials for these accounts as well as being able to pass 2FA/MFA is increasingly difficult.

Multi-Party Data Security Vigilance. Intrinsic in our approach is a multi-pronged effort to protect access to these accounts. Each account host (e.g. financial institution, gig platform, payroll provider) has their own processes in place to identify and protect invalid account access—all of which benefits the integrity of our solution.

The addition of data from 3rd party sources or supplemental internal sources provides additional, reinforcing data points—creating a "data mesh" for validation by the host platform. Identifying consistencies or inconsistencies in this collection of data from disparate sources is the foundation of many of the fraud prevention measures described. Some of the benefits and features of this process include the following. 2FA/MFA is not required for this analysis although the more rigorous the account connection process, the more heavily weighted those sources of data would be considered in any evaluation. Likewise, sources of data that are otherwise considered more trustworthy could also be more heavily weighted in any evaluation. An example includes any Financial Institution that has recently experienced a data breach might have the weighting of its data diminished.

Although not a requirement, in most cases, each data source is expected to have PII and geographic data useful for our analysis. Consistency of data across linked accounts in and of itself can be used for our evaluation—without user-provided PII—although the more data available, the better our analysis. Related to the above, the more connected accounts and supplemental data sources, the more robust our analysis. The volume of available data and number of data sources can be used to determine a level of confidence of any analysis.

To connect to the account, the user logs in, and the host platform may obtain their data. For example, the user may provide an access token that allows the host platform to pull the data of that user. In response, the host platform may pull or otherwise retrieve a bundle of financial information and profile information. The data may be stored and enriched as further described herein. For example, string cleaning may be applied on transaction strings to identify entities involved in the transaction. As another example, duplicate transaction strings (i.e., redundant strings or redundant sub-strings) may be removed and deleted. Furthermore, the host platform may execute algorithms that categorize each transaction (e.g., earned income, loan, grocery store, etc.) This data is then added to a data mesh for the user.

The access credentials provided by the user, for example, a token, a password, a username, a security code, etc., can be consumed by the host platform and integrated or otherwise embedded within a service such as a proxy service, a handler, a script, or the like. Here, the service may use the access credentials embedded therein when establishing authenticated channels between the external data sources and the host platform, which can then be executed to pull/retrieve the data of the user, including PII, from a data source associated with (corresponding to) the access credentials. In this way, the software can directly access and pull the user's PII data from a verified source of truth that has already performed an authentication (e.g., 2FA, PIN, etc.) Furthermore, if the software collects data from multiple external sources, the service can be embedded with separate access credentials for each external data source. Here, each access credential can be labeled with its corresponding data source (e.g., by URL, etc.)

Fraud Prevention

Most of current fraud prevention revolves around identity fraud, which is an enormous problem in today's world. Frequently bolstered by hacks of Personally Identifiable Information (PII) from large organizations, malicious players can collect information such as name, address, phone number(s), birthdates, social security numbers, etc. Once collected, the data can be sold to other hackers for the purpose of impersonating real people for what is usually monetary gain.

Examples include applying for financial products or government benefits by using hacked PII and then diverting funds to the hackers' accounts where it can be siphoned off. Frequently, the origination of this hack is external to the U.S., making recovery of funds increasingly difficult.

There are myriad existing solutions that attempt to prevent this through various means, some of which include:

Evaluation of PII Integrity (does this person exist). We offer a new way of doing identity verification and this can be used for the invention. We are going to compare all these records from all these different sources, to just have the account you have to have the KYC-level of protection may be not necessarily a KYC check but some sort of identity/security verification. Banks, Payroll providers, Credit Card companies, employer portal, this data has already been verified by a third party. This will look at the information submitted, compare that information against other data sets such as utility bills and other records, and determine if the combination of PII has credibility. If the combination of name, address, phone number, social security number, etc. has a long history of being seen in combination from other sources, the PII combination has credibility. However, this answers the question of "does this person seem to exist" and not "is the person providing the information the same as the information in the PII."

Identification of hacked PII. Another layer of security will compare the provided PII to datasets of known, hacked profiles to determine the likelihood that the PII has been compromised and potentially been used for other cases of fraud. Knowing that PII was part of a data breach can raise flags that the information could be used for fraud and a history of fraud using that PII alerts that hackers are actively using the information to commit fraud and, as such, additional measures might be needed to verify identity. This approach still does not address the question of whether the applicant is the actual person or an impersonator.

Document Verification. As the first level of actual identity verification, existing solutions will require applicants to submit images of identification such as driver's license, passport, etc. with information that corresponds to the submitted PII. Verification can be supplemented by cross referencing the driver's license number, passport number, etc. to PII on file for those documents to confirm consistency across the provided PII, data on the document, and data on file for that document. This adds the burden of proof that an applicant must have this documentation or have additional PII to fake such a document that will pass the cross-reference check.

Facial recognition. Frequently used in combination with document verification is facial recognition. The applicant takes a picture holding a photo ID and the photo on the ID is compared to the face of the person holding it. This is generally considered to be the gold standard of identity verification, although there are challenges with legitimate applicants being able to take a picture suitable for the technology to work effectively.

Device and geographic tagging. Slightly different than the previous methods, there are solutions that will evaluate the mechanism by which the data is being provided. Examples include:

IP Address location analysis. IP addresses from foreign countries or other suspicious locations incongruent with the PII being submitted can raise a warning, although are subject to circumvention tactics like IP-spoofing.

Device fingerprinting. Parameters such as browser type and version, OS, default language setting, etc. can be compared against known bad actors or for consistency with known devices associated with submitted PII The example embodiments are directed to an alternative to identity fraud detection as well as other fraud detection/prevention that extends even further. Because this is a completely different approach to existing solutions, it can be used on its own or in conjunction with other solutions for added integrity. In effect, creating redundancy for validation by using an alternative approach.

Identity Verification

In the example embodiments, identity verification is based on an evaluation of the PII from the various sources of available data. An example of how this might be accomplished is through fuzzy string matching and other methods of machine learning.

What is important is the general consistency of this data over time as well as the weight of the specific source of data. Variations in this data can be compensated by the number of sources being verified. For example, a significant name variation between 2 sources is more impactful than 1 name variation among a dozen sources.

An additional factor that can affect confidence is the volume of underlying data. For example, sources that have years of transaction or work history would be more heavily weighted than a recently established bank account.

PII Consistency Check

This analysis focuses on the body of data as a whole with possible weighting factors. The objective is to determine the trustworthiness of the body of data available for a user, divided into two metrics:

Integrity Score—e.g., a scale of 0 to 1 with 0 being completely inconsistent and 1 being completely consistent, although other scales are also feasible.

Integrity Check—a True/False flag that indicates if the Integrity Score meets or exceeds an Integrity Threshold deemed acceptable by the application. For example, an Integrity Threshold of 0.75 would return True for Integrity Check if the Integrity Score is >=0.75 and False if less than 0.75.

For example, if a consistency check was performed across all names from all data sources using a method such as the Sorensen-Dice Coefficient, a measure of consistency could be obtained. Extensions of this could include applying other algorithms for the analysis, heavier weighting of certain names compared to others (e.g., weighting the user-provided name more heavily than all other names in order to measure consistency of other data in the collection towards that value, etc.), applying logic that would account for name variations (e.g., so that Robert, Rob, and Bob are each considered favorable matches), and the like.

Similar logic could be applied to other types of PII data, such as Address, email, and phone number. Additionally, this type of logic could be applied across entire PII records as a measure of consistency of Name+Address+email, etc. In this latter scenario, the types of data could be weighted differently in the consistency calculation, so that, for example, consistency of the "name" field among the different PII records is given the heaviest weight, the "address" field may be weighted less than "name", but still considered consequential, "phone" and "email" fields may be given some small weight but viewed as less consequential.

Application of the Integrity Score and Integrity Check varies, but some examples include a false value for Integrity Check could trigger automatic rejection or manual review for an application such as a loan or benefits program, and associated data, such as reported income, could be normalized based on the Integrity Score. For example, for a 0.5 Integrity Score, reported income could be evaluated as an effective income less than what is reported.

In this example, the host platform may execute a program to perform an identity verification process to determine whether the user is who they claim to be. The identity verification process may identify values of PII within the data mesh and determine a consistency of the values on as a whole. Each piece of PII may be analyzed separately. For example, the process may start with a check of whether the names (first and last) are consistent, whether the email addresses are consistent, whether the geographical addresses are consistent, etc. The software can do a field-by-field analysis or it may analyze the consistency of the whole record where individual fields may be weighted.

Suspicious Data Source Check

Closely related to the PII Consistency Check is the Suspicious Data Source Detection check. Whereas the PII Consistency Check is a score across the entire body of PII, the Suspicious Data Source Check scores each individual PII record. Each would have an Integrity Score and Integrity Check similar to what was previously described. For example, if there are 10 records with 8 listing Name as "John Smith" and 2 listing the Name as "Sarah Johnson," the 8 might receive high Integrity scores and the 2 might receive low Integrity Scores.

Alternative logic might assign different weight to each record. For example, if one of the "Sarah Johnson" records is considered to be the benchmark by which all other records should be evaluated, the records with "John Smith" would have low Integrity Scores. This scoring could be used in various ways, but one scenario is for an application where showing as much income as possible is beneficial to the user, so bad actors might be encouraged to connect to sources of income data that does not belong to them. Scoring each data source individually would allow for income data to be ignored from sources that have a low Integrity Check, thus protecting against such fraudulent activity.

Similar to the PII Consistency Check, this evaluation is not limited to the Name field and could be applied to other data types or across multiple data types collectively, with the possibility of weighting the various types differently depending on the application.

Suspicious Transaction Classification Detection

For financial institution transactions, each transaction can have associated with it a category and potentially subcategories. Examples of these include, but are by no means limited to:
Transfer
ATM deposit
Refund
Bank Fee
Expense
Restaurant
Utilities
Auto
Grocery
Income/Work Earnings
Employee/W2 income
Self-employment/1099 income These categories can be assigned in various ways, including by the:
Financial Institution
data providers connected to Financial Institutions
user-authorized application collecting transaction data from data providers
users themselves In the instances that there is disagreement between these various categories, specifically in the case of user-assigned categories, algorithms can be applied to determine if such categorization might be inaccurate and potentially fraudulent.

For example, if a data provider and user-authorized application both categorize a transaction as a transfer, but the user categorizes the transaction as self-employment income, that could result in a lower Integrity Check for that individual transaction.

Similar to the processes previously described, the weight associated with each assigned category can be set by the entity that performed the categorization. For instance, a user-authorized application may be weighted at 0.75 while weighting 0.25 to the categorization of a Financial Institution.

In some examples, if the categorization of the user-authorized application, Financial Institution, and user all agree, the Integrity Score would be high. If the categorization of the user-authorized application and the user agree, but are different from the Financial Institution, the expectation would be for a relatively good Integrity Score. If the categorization of the Financial Institution and the user agree, but are different from the user-authorized application, the expectation would be for a lower Integrity Score. If the categorization of the user-authorized application and the Financial Institution agree, but are different from the user, the expectation would be for a much lower Integrity Score, and the like.

If an Integrity Check is in place, its True/False value would depend on the Integrity Threshold setting.

An example of the application of this logic is the case that a user is motivated to show as much income as possible and categorizes incoming "transfers" as "Work Earnings" to artificially bolster their income. Transactions that don't meet the acceptance criteria defined for an application could lead to: The exclusion of that transaction from consideration, a discounting of the transaction amount as deemed appropriate by business rules, flagging for a manual review of the collective information, especially in the case that a high volume or high aggregate sum are marked as suspicious, etc.

Geographic Verification

Each source of data can provide additional details beyond PII, some of which can be used for geographic verification. Examples include Account PII data could specify address, city, state, zip code, etc., financial transaction data could specify location of in-person expenses via a Point of Sale (POS) system requiring a physical "card swipe", work information could include address information for the user as well as location data for where work was performed. This is especially prevalent with gig platforms that can provide latitude/longitude data on pickup and drop off locations.

All of this is useful to correlate a user's actual, physical location at points in time based on the timestamps associated with each transaction. Unlike tactics like IP-spoofing, this type of geographic data is more difficult to manipulate and can be far more voluminous, dramatically enhancing certainty.

Not only does this enhance the protection from foreign bad actors committing identity fraud, it protects in cases where domestic location is a requirement for the applicant. For example, someone applying for unemployment benefits in California with all recent expense transactions and gig work in Georgia could be of concern.

The first step of this analysis is resolving the data to a geographic location. In some cases, the data source will resolve the data to a location such as Atlanta, Ga. In the cases that Latitude/Longitude is provided, that can be resolved to a geographic location through lookup tools to a city, state, zip code, even address. A more comprehensive approach may translate whatever data is provided to a combination of latitude, longitude, city, state, country, postal code, and address if possible.

Generally, the analysis may be framed by a time period such as location in the past 6 months, 12 months, last year, etc. That time period may filter the available data set to be analyzed and result in a calculation of the likely location of the user during that time period with an associated confidence score, with the geographic sensitivity defined based on the business application—for instance, is the sensitivity by country, state, or city. As an example, a result might look like:

Confidence of user's state location within the past 6 months:
Georgia—85%
Mississippi—10%
Massachusetts—5%

In a simplistic algorithm, this might be determined based on the sum of days with geographic data available grouped by location and a percentage calculated. Additional parameters may also be considered as well as machine learning analysis.

As an example, a more advanced analysis might establish a "home base" location and days without geographic data may be weighted more heavily towards that home base attribution. As another example, a more advanced analysis may use machine learning that could take into account historic travel patterns to resolve days without geographic data and, in the confidence calculation, throw out or greatly diminish geographic data deemed as aberrations such as what seems like a weekend trip.

The algorithms may also take into account the distance between location data points which affect the analysis. For instance, if someone has transaction data from Danbury, CT and New York City, NY, the geographic proximity could be used to focus the algorithm on those data points and reduce the emphasis on lower volume of data from a location such as San Francisco.

In the above scenario, other information might be used to improve the confidence calculation. For instance, the geographic location of weekend expenses at grocery stores could be used to build confidence that a person lives in Danbury, CT and likely commutes to work in New York City.

Applications of this analysis may include, but are not limited to, state benefit programs that may want to verify they are paying benefits to claimants that work and/or earn in their state, any application that wants to verify an address provided to them for a person can use this analysis of real-world geographic data to gain confidence a home address is legitimate, etc.

Suspicious Activity Detection

Geographic Verification can lead to the identity of suspicious activity, as illustrated in the previous examples. However, other suspicious activity is also identifiable with the solution described herein. For example, recently-created accounts from banks or gig platforms are not necessarily disqualifying, but more established accounts may carry more weight. As another example, an account with frequent activity is more compelling than one with sparse activity, regardless of age. As another example, application for unemployment benefits in one state with financial transactions showing unemployment benefits being received from a different state. As another example, physical transactions occurring in geographically dispersed locations within unrealistic time frames. For example, a purchase in New York City followed an hour later by a delivery activity in Seattle, WA. Hiding of financial accounts may also be considered. For example, when performing income verification, the user may be expected to connect to all financial and gig/employer/payroll accounts for visibility, however, known or highly suspected accounts that have not been connected represent suspicious activity.

Examples of how these missing accounts might be identified include the presence of transfer transactions in a linked account hosted by a financial institution where the corresponding transaction is not available in any of the collection of linked accounts, known sources of income not having deposit information in connected financial institution accounts, known sources of income not having the associated gig/employer/payroll accounts linked, etc.

Each of these factors can have its own individual risk scoring or they can be used in combination to create an overall suspicious activity risk score, with each factor being weighted as appropriate for the business need.

FIG. 1A illustrates a computing environment 100 for identity and income verification in accordance with an example embodiment. In this example, a host platform 120 may host an application that performs identity and/or income verification such as described herein. Here, a front-end 122 of the application may be downloaded from a marketplace, etc., and installed on a user device 110 such as a mobile device, a smart phone, a tablet, a laptop, a personal computer, etc. It should also be appreciated that the host platform 120 may host a web application, a website, an authentication portal, or the like, which involve verifying a user online.

In this example, a user may input account numbers/routing numbers of bank accounts, employer accounts (e.g., gig employers, etc.), payroll company accounts, credit accounts, etc., held by trusted sources of truth such as banks, credit agencies, payroll processors, employers/organizations, institutions, and the like, into one or more input fields displayed within a user interface of the front-end 122 of the application and submit them to the host platform 120 by clicking on a button within the user interface of the front-end 122. For example, the user device 110 and the host platform 120 may be connected via the Internet, and the front-end 122 may send the information via an HTTP message, an application programming interface (API) call, or the like. When the account identifiers.

In response to receiving the account information, the host platform 120 may register/authenticate itself with various trusted sources of truth where the accounts/user accounts are held/issued. For example, the host platform may perform a remote authentication protocol/handshake with a financial institution server 130, a payroll processor server 140, and an employer server 150, another data source 160, and the like, based on user account information that includes an account issued by the bank, a source of funds from the payroll processor, and an employer that pays the user. These accounts provide the host platform with a unique mesh of partially-overlapping data sets that can be combined into one larger data set and analyzed. In the example embodiments, the combination of data from the different sources of truth (e.g., financial institution server 130, payroll processor server 140, employer server 150, and other sources 160) can be combined into a data mesh 124 by the host platform 120.

The authentication process may include one or more API calls being made to each of the different third-party services (bank, payroll, employer, etc.) via a back-end of the software application on the host platform 120 to establish a secure HTTP communication channel. For example, the back-end of the software application may be embedded with access credentials of the user for accessing the different third-party services. The back-end may then use these embedded credentials to establish or otherwise authenticate itself with the third-party services as an agent of the user. Each authenticated channel may be established though a sequence of HTTP communications between the host platform 120 and the various servers. The result is a plurality of web sessions between the host platform 120 and a plurality of servers, respectively. The host platform 120 can request information/retrieve information from any of the servers, for example, via HTTP requests, API calls, and the like. In response, the user data can be transmitted from the servers to the host platform 120 where it can be combined the data mesh 124 for further processing.

Figure 1B:
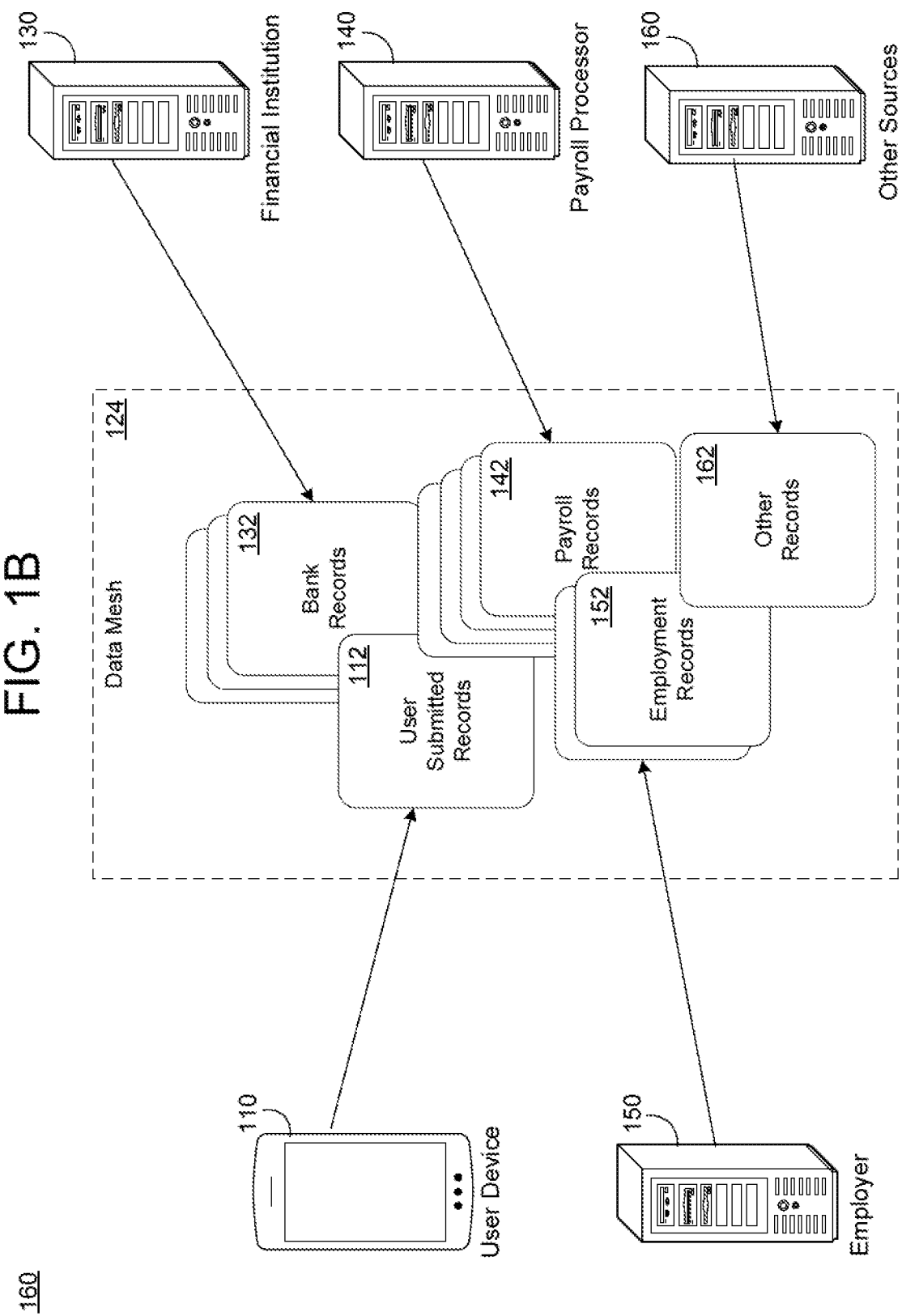
FIG. 1B is a diagram illustrating a process of building a data mesh in accordance with an example embodiment.

FIG. 1B illustrates a process 160 of building a data mesh in accordance with an example embodiment. Referring to FIGS. 1A and 1B, the host platform 120 may receive a first subset of data records 132 from the financial institution server 130, receive a second subset of data records 112 from the user (via the user device 110), a third subset of data records 142 from the payroll provider server 140, a further subset of data records 152 from the employer server 150, and a fifth subset of data records 162 from other sources 160. The records each include personally identifiable information of the user, for example, first name, last name, social security number (SSN), address, city, street, state, zip code, email address, phone number, and the like. Each of the subsets 132, 112, 142, 152, and 162 may be combined into one large data mesh 124.

Figure 2B:
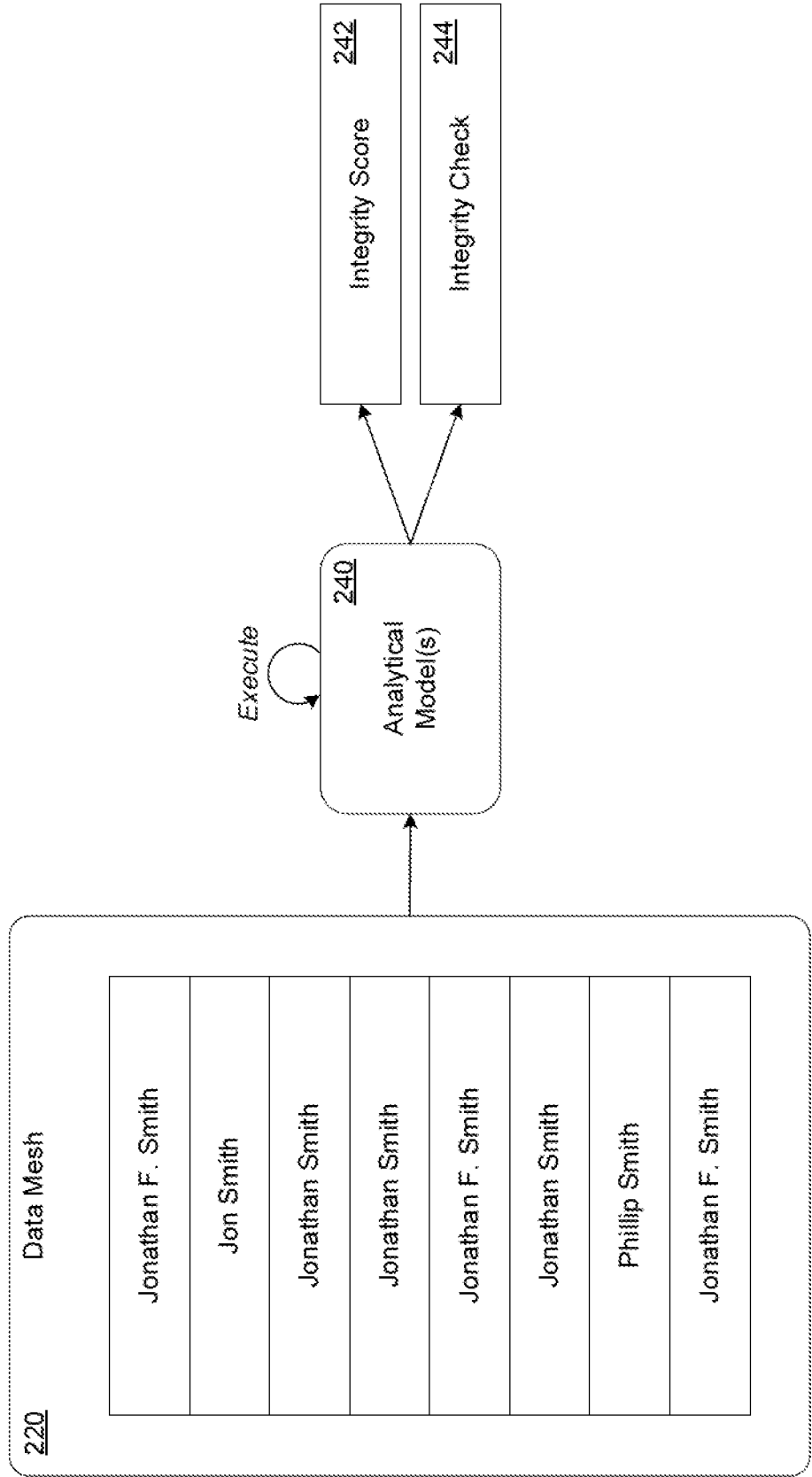

FIGS. 2A-2C illustrate an identity verification process in accordance with example embodiments. For example, the process may be performed based on the combination of data records within a data mesh as described in the example embodiments. In particular, FIG. 2A illustrates a process 200 of performing a consistency check on a particular field of PII (name) throughout a corpus of data records obtained from multiple sources of truth. Referring to FIG. 2A, a corpus of data records 210 is shown. Here, each of the data records may have some form of PII such as a name value 211, a city/state value 212, SSN value 213, zip code value 214, phone number value 215, email address value 216, and the like.

In this example, a value for name 211 is separately identified from each (or most) of the data records, and compared to each other for consistency. Here, the corpus of data records 210 can be read by the host platform to identify name values 211 in each of the data records. If one or more data records do not have a name value, they can be ignored or omitted. In this example, eight (8) name values are identified from PII included in eight different data records where some of the records are from various/differing sources of truth. The name values can be stored in a data mesh 220 by the host platform.

FIG. 2B illustrates a process 230 of analyzing the data mesh 220 including the name values for consistency. In this example, the data mesh 220 can be input into one or more analytical models 240 which can perform a consistency check. As a non-limiting example, the analytical models 240 may be machine learning models such as fuzzy matching, or the like. In this example, the purpose of the analytics 240 is to determine how different/similar the name value is across the different data records. Here, the name value may refer to just the first name, last name, or a combination of names (including the middle name and/or initial). An output of the analytical models 240 may be an integrity score value 242

(e.g., from 0 to 100, etc.) and an integrity check value 244 which is a yes/no value that is determined by comparing the integrity score value 242 to a predetermined threshold for that particular field of PII (i.e., for the name in this example). If above the threshold, the integrity check value 244 is set to yes/true, otherwise its set to no/false.

This one consistency check may be enough to perform an identity verification. For example, it may be clear after just one consistency check that this user is not who they claim to be. As another example, it may take multiple different values of PII to be considered. FIG. 2C illustrates a process 250 in which an aggregate integrity score 248 is created. Here, the host platform may perform a respective consistency check for multiple different values of PII simultaneously (in parallel) with one another. For example, each consistency check may be performed in parallel by different cores of a multi-core processor or different threads of another execution engine. As another example, the consistency checks may be performed sequentially, one after the other.

In FIG. 2C, four different integrity scores 242, 245, 246, and 247 are generated for four different fields of PII (name, SSN, address, and email) across the corpus of data records. Furthermore, the integrity scores 242, 245, 246, and 247 can be weighted differently (if desired) and then aggregated together by a function or model to create the aggregated integrity score 248. This aggregated integrity score 248 can be used to make a final decision on whether the identity of the user is verified or whether it is not.

Based on one or more integrity scores, the back-end of the software application may make a decision of Yes or No that the identity is verified. This information may be used to modify the original corpus of data records in the data mesh to include a value for such a decision. As another example, the identity verification process result such as one or more of the integrity scores may be an input into a decision by the back-end of the software application on whether to activate a new account with the software application based on the identity verification determination. Here, the host platform may only activate the account when the integrity score and/or integrity check values satisfy predefined thresholds. If so, the activation may enable the user to participate in the software application as an active user. This may give the user rights to send messages to other users of the software application, create an account profile, browse web listings, browse employment opportunities, and the like.

Income Verification

Current income verification is archaic and largely designed for workers that are classified as "employees" or "W2 workers." Typically this is done by an employer reporting for W2 or access to tax filings by the worker for tax agencies. The shortcomings are the entity requiring this data must have access to these filings. This is more easily available for government agencies than non-governmental organizations such as lending institutions. Furthermore, new hire data may be unavailable for a few months, there may be no W2 data for self-employed/1099 workers, claimant tax filings can show both W2 and 1099 income, and the like. These filings can be made available by the individual through means like document upload, but that is subject to fraud through the manipulation of the data in the document.

Other problems include that the data can be up to a year old and is for the entire previous year, with no data available by quarter, month, week, or day. Self-employed income may not have been reported and may not have any backup documentation by the income source. For instance, in many states, companies like Uber are not required to file a 1099-K unless the person has performed 200 "tasks" and generated at least $20,000 in gross income to Uber.

Another source is Reporting Agencies such as credit agencies, which offer products that can provide employment and income information for W2 workers. While this information is more current than other methods, there remain significant limitations. These agencies only have access to data from employers and payroll companies they have negotiated data partnerships with. There is also no access to self-employment/1099 income. Government agencies have the ability to access this information with PII data, but frequently that data must be confirmed by individuals to be accurate in a 2-step process.

In the example embodiments, income verification is based on PII and transaction data collected from various sources into a data mesh. This provides the host with data direct from multiple different "sources of truth" via the connected accounts. The data is typically robust data that is up-to-date within hours of new activity. Furthermore, the data may include overlapping data points that can reinforce the integrity of the data. For example, overlapping data points may be created by comparing transactions from an employer account to an employee's bank account, but there are many other examples. In this reinforcement process, the host platform may identify redundancy from the income source (eg Employer) where the amount is being sent from to the account where the amount is being sent. Furthermore, through reconciliation and deduplication, the host platform can recognize the deposits from an employer and verify the arrival in the user's bank account, etc. The system can take all of that and build a reinforcing view.

Within the income verification process described herein, users may connect to their gig/employer/payroll accounts so the host system can collect historic income information. Additionally, users may connect to their financial institutions and enable the host to also collect their historical financial data. Transactions may undergo transaction string cleaning and categorization to identify income sources and transaction types such as refunds, transfers, work income, etc. The reconciliation and deduplication process may associate related transactions (i.e., counterparts).

Here, the host platform may also categorize the transactions within the data mesh into various predefined categories such as income, grocery, gas, credit card, etc. The categorization algorithm can be a machine learning algorithm with a human in the loop or the like. A suspicious transaction identification algorithm may be a machine learning algorithm as well. Here, the host platform may take classifications from multiple sources, weight the classifications and compare them to what the user is trying to do, decide whether this is a valid classification, and the like.

Furthermore, additional examples described below can be implemented as a whole or in parts. For example, users may be allowed to provide additional information on transactions not reconciled to gig/employer/payroll transactions. For deposits, this may include naming of the income source and classification of the income such as W2 income, 1099 income, refund, alimony, Unemployment Benefit, etc. For expenses, this may include naming of the expense and classification of the expense such as grocery, utility, education, etc. Users may be allowed to self-report any additional income not represented in the data from connected sources, however, these non-verified income events may be clearly demarcated from those that are tied to verifiable data from connected sources.

Users are allowed to self-report any additional expenses not represented in the data from connected sources, although those too are clearly demarcated from expenses tied to verifiable data such as expense transactions identified in connected financial institution accounts. This can include the reporting of mileage associated with work, which is translated to an expense amount based on the IRS rate for that time period. Other reported expenses allow user-entered description of the expense. Furthermore, to ensure that the host platform has the most comprehensive collection of data related to a user's financial information, additional processes can be used to discover data sources that have not been connected to or additional data that needs further input from the user for completeness.

In some embodiments, fraud prevention tools can also be applied during the income verification process. Here, results of those processes can be used to augment the income verification report. Thresholds can be set for each process and failure to meet any of those thresholds can trigger events on the receiving party's end, such as automatic rejection of an application or the forwarding of the information to a manual review. Additional calculations can be performed based on the results of the fraud detection processes, such as the determination of "adjusted income" that ignores or de-emphasizes data from suspicious data sources or individual transactions. Suspicious data identified in the fraud processes can be highlighted, for example, in a report format (such as pdf) or in the underlying data itself that can help focus any manual or automated review of the data by the receiving party for auditing, adjudication, or secondary review/decisioning.

Users can choose to share any income for instance, as proof of income for renting an apartment. There are various ways this could be done, including: a user could share the report (e.g., in pdf format) with a 3rd party that could make decisions based on the shared information, a 3rd party could verify income verification reports shared with them by calling a support line or visiting a website where the report ID could be used to look up the report details, a link to the report could be shared with 3rd parties that would allow direct access to the report without the risk of user manipulation. In this approach the user might customize the parameters of the report to suit the needs of the receiving party. For instance, creating a report within a specific time period (e.g., past 6 months).

Another approach is direct integration by a 3rd party Partner. For example, a user or referring Partner may submit a user identifier (e.g., claimant ID, GUID, etc.) that identifies them to the Partner they want to share income data with. That ID is associated with the user's profile specific to the partner/program. When the Income Verification report is ready, the user submits the data and that host platform may transmit the information to the Partner with the user identifier, which will allow the 3rd party to reconcile the data internally.

There are a variety of ways the user can be handed to the host platform described herein, including a secure URL link with the user identifier and Partner/program included in the link, a co-registration/SSO handoff, a user identifier and PIN provided to the user that can be entered into an onboarding screen hosted by the host platform, and the like. In this example, the user identifier and PIN are then compared to a lookup table of valid combinations to verify authenticity. Data returned to the partner can also be in various forms, including a pdf report, JSON data, or a csv file. The delivery mechanism can likewise vary depending on the Partner's need, some of which include, but is not limited to direct transmission of the data to an API endpoint provided by the partner, a webhook for the Partner with a corresponding API endpoint hosted by Steady for the retrieval of the data, a batch FTP transmission to the partner on a periodic basis, etc.

For direct integrations, the host platform may maintain a list of programs specific to each partner and the rules around the report/data that should be returned. For example, a first partner may have multiple programs that need income verification. Here, a program may require passing the user to the host platform/site/mobile application, via a secure link referral with various return data requirements, for example, historical income over a predetermined period of time (last 6 months, etc.) Here, the host platform can generate a PDF or other document that includes an identity and/or income verification report, and send the report via a webhook/response architecture.

Furthermore, an income passport may be created to act as a centrally managed, authoritative proof of financial information for any user. The filtering of the data (e.g., by date, income type, etc.) and transmission of that information are simply various forms of data management. This creates a new opportunity—the enabling of income portability for any user to any destination for any purpose they see fit.

From this centrally managed source of financial truth, it becomes possible to easily share the information with others, including, but not limited to: government agencies for benefit programs (e.g. SNAP, Medicaid, Unemployment insurance, etc.), for-profit businesses for access to financial products (e.g. mortgages, credit cards, etc.), research institutions to guide policy or other activities (e.g. worker groups, state workforce development agencies, etc.) In short, it becomes an income passport.

This not only allows users to share data with Partner programs, but allows the host platform to provide a marketplace of destinations where sharing such information could be beneficial. Examples include, but are not limited to, a credit product from a Partner that any user can submit financial information to in order expedite decisioning and to secure beneficial terms, Government or Grant programs recommended to users based on our knowledge of their financial situation, personal development opportunities, such as upskilling programs, that have income requirements where the host platform knows the user would qualify for, and the like.

Based on the consolidated effort to create an authoritative financial profile, multiple opportunities could be revealed using algorithms to identify matching programs and dramatically decrease the effort to gain access to those programs. While it is expected that most if not all sharing Partners would require the user to review their information prior to transmission of the data, there are two nuances worth describing that are possible, but may or may not be implemented. The first is automated reminders to users. In the case that a program requires updated financial data periodically (e.g., every 6 months), the host platform can notify users of the submission deadline and have them review and manually submit their information as previously described.

Additionally, it is possible that users could authorize "pull" access to their data by a Partner for some period of time. Two examples of this might be a research or policy group the user is associated with might benefit from having constantly updated financial information from their members. For this reason, the member user may allow that group to access their real time data on an unlimited basis for some period of time (e.g., 6 months, etc.) As a second example, a credit product might offer discounted rates for any customers that maintain income level above a certain threshold, but require their income be monitored to obtain that special rate.

The benefits of the example embodiments include the use of data provided through user-permissioned account connections, supplemented using data with internal and 3rd party data. Also, the example embodiments may deploy extensive data enrichment tools that can be used in various combinations such as transaction string cleaning, reconciliation and duplication of transaction data, fraud detection/prevention, etc. The system also allows near real time access to work income data and includes user-permissioned sharing of that income data.

Some other benefits of the income verification process are that it can support both W2 and self-employed/1099 income data, the data is current, the income information can be determined down to the day and, in some cases, down to the hour (for some gig accounts), there is no reliance on employers filing documents or establishing partnerships with employers/payroll providers, and the like. Also, using Financial Institution data gives the income verification process significant additional coverage when employer or payroll provider is unavailable. Furthermore, user verification of the data may be a native part of the income verification process. "Chain of custody" of the income data may be maintained and any supplemental data provided by the user that is not supported by a connected data source may be clearly identified.

FIGS. 3A-3C illustrate an income verification process in accordance with example embodiments. For example, FIG. 3A illustrates a process 300 of comparing partially overlapping transaction data sets 310 and 320 from two user accounts including a user's savings account and a payroll processor account associated with the user's employer, respectively. In this example, the host platform may perform a transaction string cleaning process as described in U.S. patent application Ser. No. 17/342,622, filed on Jun. 9, 2021, in the United States Patent and Trademark Office, and a transaction reconciliation and deduplication process as described in U.S. Provisional Patent Application No. 63/208,528, filed on Jun. 9, 2021, in the United States Patent and Trademark Office, the entire disclosures of which are hereby incorporated herein.

In the example of FIG. 3A, the host platform detects that a transaction 311 in the user's savings account matches/corresponds to a transaction 321 in the user's account with the payroll processor. Likewise, a transaction 312 in the user's savings account corresponds to a transaction 322 in the user's payroll account. In other words, the host platform detects that two transaction strings within account summaries of the two accounts hosted by the trusted sources are corresponding to each other. In this case, the two accounts may be the opposite sides (i.e., counterparts) of a financial transaction (e.g., payor and payee). As another example, both accounts may be user accounts. The result is the data mesh 330 shown in FIG. 3B. Here, the host platform performs a process 340 which generates three data sets including an unmatched transaction data set 331, a first matched transaction data set 332, and a second matched transaction data set 333.

Thus, the host platform of the example embodiments is able to read through transaction data sets from different trusted sources and identify common/linked transactions between two or more transaction data sets. In other words, the host platform identifies transactions that overlap. This redundancy can be used for verification purposes as noted by the above-incorporated patent applications.

FIG. 3C illustrates a process 360 of processing the second and third data sets 332 and 333 of the data mesh via an analytical model 350. The output of the analytical model 350 is a determination of whether the income is verified. For example, the output 352 may include a score, a yes/no or other binary value, and the like. The host platform cleans all the data so everything else can access it and do their things (fraud+income verification). FIG. 3C can represent how the income verification process can combine all the pieces together to deliver an output. For example, the process might use ID Verification with certain thresholds, transaction integrity with other thresholds, and decide to not use geographic verification, etc.

FIG. 4 illustrates a method 400 of executing an identity verification process in accordance with an example embodiment. As will be appreciated, the example of FIG. 4 is just one example of a flow, and is not limited thereto. Furthermore, one or more of the steps shown in FIG. 4 may be omitted and/or performed in a different order. Also, different steps may be included which are not shown. For example, the method 400 may be performed by a host platform receiving data from different external sources, via the Internet.

Referring to FIG. 4, in 410, the method may include establishing, via a host platform, a first authenticated communication channel between the host platform and a host server of a user account. In 420, the method may include establishing, via the host platform, a second authenticated communication channel between the host platform and a host server of a second user account. For example, the establishing of the first and second authenticated communication channels may include communicating with an application programming interface (API) of the web server of the user account and a second API of the web server of the second user account. In some embodiments, the user account and the second user account each correspond to at least one of a payroll account, a bank account, and an employment account, respectively.

In 430, the method may include retrieving, via the first and second established authenticated communication channels, personally identifiable information (PII) of the user from the first and second user accounts and combining the PII from the first and second user accounts into a meshed data set. In 440, the method may include determining, via the host platform, a difference between personal identifiable information (PII) within the meshed data set. In 450, the method may include verifying an identity of the user based on the determined difference between the PII within the meshed data set and transmitting the verification to a computer system.

In some embodiments, the method may further include executing one or more analytical models on the meshed data set and displaying outputs of the one or more analytical models via a user interface. In some embodiments, the determining may include identifying one or more geographical locations of the user that are shared among each of the first and second user accounts via the meshed data set, and verifying the identity of the user based on the identified one or more geographical locations. In some embodiments, the determining may include translating transaction strings into geographic data points comprising one or more of geographical coordinate data points, a city name, a zip code, and an address, and comparing the geographic data points to each other.

In some embodiments, the verifying may include verifying whether a specific field of personal identifiable information (PII) is consistent among overlapping data records within the meshed data set. In some embodiments, the specific field of PII may include one or more of a full name, a social security number, a geographical address, a driver's license number, and a date of birth. In some embodiments, the determining may include generating separate determinations for multiple different fields of PII within the meshed data set, and aggregating the determinations together to make one final determination.

It should also be appreciated that in some embodiments, income amounts may be discounted or rejected or flagged as suspicious based on an evaluation of the integrity of those amounts or the sources from where the data originated" or some such.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
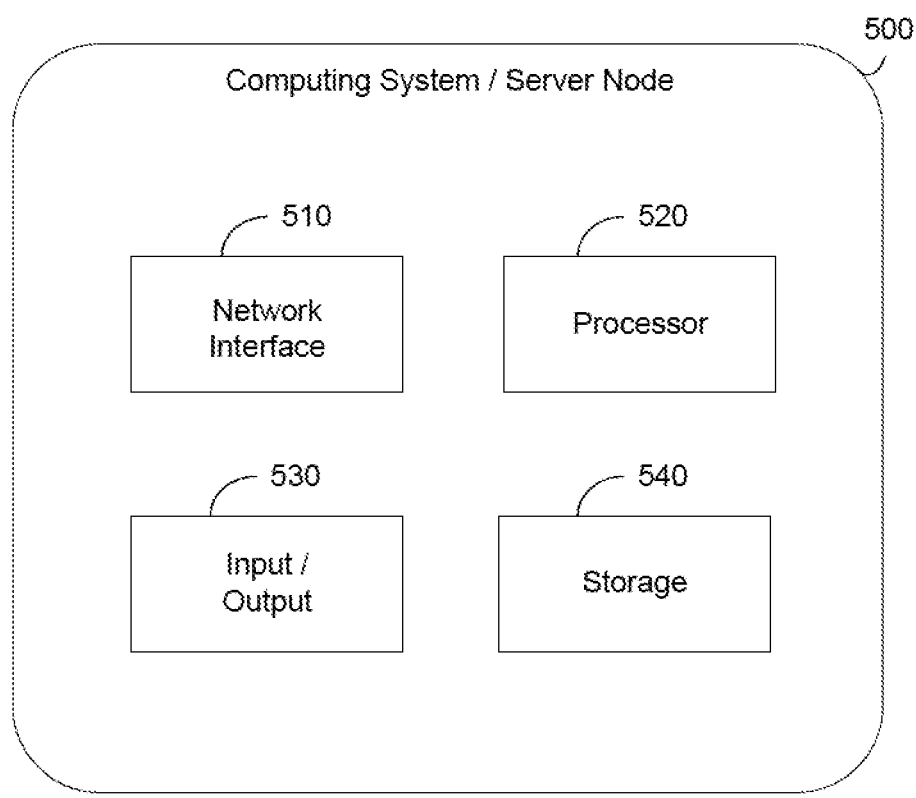
FIG. 5 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computing system 500 which may represent or be integrated in any of the above-described components, etc. FIG. 5 is not intended to suggest any limitation as to the scope of use or functionality of embodiments described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 500 may be a tokenization platform, server, CPU, or the like.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 5, the computing system 500 is shown in the form of a general-purpose computing device. The components of computing system 500 may include, but are not limited to, a network interface 510, one or more processors or processing units 520, an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 540 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a network interface configured to communicate via a network; and
a hardware processor configured to:
establish, via the network interface, a first authenticated communication channel between a host platform and a host server of a user account of a user, and a second authenticated communication channel between the host platform and a host server of a second user account of the user,
retrieve, via the first and the second established authenticated communication channels, personally identifiable information (PII) of the user from the first and the second user accounts;
combine the PII from the first and the second user accounts into a meshed data set;
determine, by an execution of an analytical model, a difference between PII of the user within the meshed data set, the analytical model generating an output including a integrity score value represented by a predefined range of values and an integrity check value represented by a binary value, the binary value being determined based on a specified relationship between the integrity score value and a predetermined threshold value;
verify an identity of the user based on at least one of the integrity score value and the integrity check value; and
transmit an indication of the verification to a computer system.

2. The computing system of claim 1, wherein the user account and the second user account correspond to at least one of a payroll account, a bank account, and an employment account.

3. The computing system of claim 1, wherein the processor is further configured to execute one or more analytical models on the meshed data set and display an output of the one or more analytical models via a user interface.

4. The computing system of claim 1, wherein the processor is further configured to identify one or more geographical locations of the user that are shared among each of the first and the second user accounts via the meshed data set, and verify the identity of the user based on the identified one or more geographical locations.

5. The computing system of claim 4, wherein the processor is further configured to translate transaction strings into geographic data points comprising one or more of geographical coordinate data points, a city name, a zip code, and an address, and comparing the geographic data points to each other.

6. The computing system of claim 1, wherein the processor is configured to establish the first and the second authenticated communication channels via communication with an application programming interface (API) of the host server of the user account and a second API of the host server of the second user account.

7. The computing system of claim 1, wherein the processor is further configured to verify whether a specific field of personal identifiable information (PII) is consistent among overlapping data records within the meshed data set.

8. The computing system of claim 7, wherein a specific field of PII comprises one or more of a full name, a social security number, a geographical address, a driver's license number, and a date of birth.

9. The computing system of claim 1, wherein the processor is further configured to;
generate separate determinations of a difference between PII of the user for each of multiple different fields of PII within the meshed data set;
assign a weighted value to the separate determinations; and
aggregate the weighted value of the separate determinations together to generate one final determination that is used to verify the identity of the user.

10. A method comprising:
establishing, via a host platform, a first authenticated communication channel between the host platform and a host server of a user account of a user;
establishing, via the host platform, a second authenticated communication channel between the host platform and a host server of a second user account of the user;

retrieving, via the first and the second established authenticated communication channels, personally identifiable information (PII) of the user from the first and the second user accounts and combining the PII from the first and the second user accounts into a meshed data set;

determining, by an execution of an analytical model of the host platform, a difference between PII within the meshed data set, the analytical model generating an output including a integrity score value represented by a predefined range of values and an integrity check value represented by a binary value, the binary value being determined based on a specified relationship between the integrity score value and a predetermined threshold value; and verifying an identity of the user based on at least one of the integrity score value and the integrity check value; and transmitting an indication of the verification to a computer system.

11. The method of claim 10, wherein the user account and the second user account correspond to at least one of a payroll account, a bank account, and an employment account.

12. The method of claim 10, wherein the method further comprises executing one or more analytical models on the meshed data set and displaying outputs of the one or more analytical models via a user interface.

13. The method of claim 10, wherein the determining comprises identifying one or more geographical locations of the user that are shared among each of the first and the second user accounts via the meshed data set, and verifying the identity of the user based on the identified one or more geographical locations.

14. The method of claim 13, wherein the determining comprises translating transaction strings into geographic data points comprising one or more of geographical coordinate data points, a city name, a zip code, and an address, and comparing the geographic data points to each other.

15. The method of claim 10, wherein the establishing of the first and second authenticated communication channels comprises communicating with an application programming interface (API) of the host server of the user account and a second API of the host server of the second user account.

16. The method of claim 10, wherein the verifying comprises verifying whether a specific field of personal identifiable information (PII) is consistent among overlapping data records within the meshed data set.

17. The method of claim 16, wherein a specific field of PII comprises one or more of a full name, a social security number, a geographical address, a driver's license number, and a date of birth.

18. The method of claim 10, wherein the determining comprises:

generating separate determinations of a difference between PII of the user for each of multiple different fields of PII within the meshed data set;

assigning a weighted value to the separate determinations; and aggregating the weighted value of the separate determinations together to generate one final determination that is used to verify the identity of the user.

19. A non-transitory computer-readable medium comprising instructions which, when executed by a processor of a computing device, cause the processor to perform a method comprising:

establishing, via a host platform, a first authenticated communication channel between the host platform and a host server of a user account of a user;

establishing, via the host platform, a second authenticated communication channel between the host platform and a host server of a second user account of the user;

retrieving, via the first and the second established authenticated communication channels, personally identifiable information (PII) of the user from the first and the second user accounts;

combining the PII from the first and the second user accounts into a meshed data set;

determining, by an execution of an analytical model of the host platform, a difference between PII of the user within the meshed data set, the analytical model generating an output including a integrity score value represented by a predefined range of values and an integrity check value represented by a binary value, the binary value being determined based on a specified relationship between the integrity score value and a predetermined threshold value; and verifying an identity of the user based on at least one of the integrity score value and the integrity check value; and transmitting an indication of the verification to a computer system.

20. The non-transitory computer-readable medium of claim 19, wherein the verifying comprises verifying whether a specific field of personal identifiable information (PII) is consistent among overlapping data records within the meshed data set.

* * * * *

UNITED STATES PATENT AND TRADEMARK OFFICE
CERTIFICATE OF CORRECTION

| | |
|---|---|
| PATENT NO. | : 12,034,739 B2 |
| APPLICATION NO. | : 17/580721 |
| DATED | : July 9, 2024 |
| INVENTOR(S) | : Marcel Crudele et al. |

It is certified that error appears in the above-identified patent and that said Letters Patent is hereby corrected as shown below:

On the Title Page

(71) Applicant:
Replace "STEADY PLATFORM LLC, Atlanta, GA (US)" with -- STEADY PLATFORM INC., Atlanta, GA (US) --

(73) Assignee:
Replace "STEADY PLATFORM LLC, Atlanta, GA (US)" with -- STEADY PLATFORM INC., Atlanta, GA (US) --

Signed and Sealed this
Sixth Day of August, 2024

Katherine Kelly Vidal
*Director of the United States Patent and Trademark Office*